United States Patent
Takahashi

(10) Patent No.: US 9,255,942 B2
(45) Date of Patent: Feb. 9, 2016

(54) MOBILE TERMINAL AND CONTINUOUS MOVEMENT DETECTION METHOD

(75) Inventor: Makoto Takahashi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 494 days.

(21) Appl. No.: 13/881,041

(22) PCT Filed: Jul. 9, 2012

(86) PCT No.: PCT/JP2012/067519
§ 371 (c)(1),
(2), (4) Date: Apr. 23, 2013

(87) PCT Pub. No.: WO2013/008796
PCT Pub. Date: Jan. 17, 2013

(65) Prior Publication Data
US 2013/0325392 A1 Dec. 5, 2013

(30) Foreign Application Priority Data
Jul. 11, 2011 (JP) .................................. 2011-153292

(51) Int. Cl.
| | |
|---|---|
| G01C 21/10 | (2006.01) |
| G01P 15/00 | (2006.01) |
| G01C 22/00 | (2006.01) |
| H04M 1/725 | (2006.01) |

(52) U.S. Cl.
CPC ................ *G01P 15/00* (2013.01); *G01C 21/10* (2013.01); *G01C 22/006* (2013.01); *H04M 1/72563* (2013.01)

(58) Field of Classification Search
CPC combination set(s) only.
See application file for complete search history.

(56) References Cited

U.S. PATENT DOCUMENTS

| | | | |
|---|---|---|---|
| 2008/0140338 A1* | 6/2008 | No et al. .................... | 702/141 |
| 2009/0143199 A1* | 6/2009 | Nishibayashi .................. | 482/8 |

FOREIGN PATENT DOCUMENTS

| | | |
|---|---|---|
| EP | 2 065 680 A2 | 6/2009 |
| EP | 2 065 680 A3 | 6/2009 |
| JP | 2009 288233 | 12/2009 |

OTHER PUBLICATIONS

International Preliminary Report on Patentability for PCT/JP2012/067519 issued on Jan. 14, 2014.*
International Search Report Issued Oct. 2, 2012 in PCT/JP12/67519 Filed Jul. 9, 2012.
Combined Chinese Office Action and Search Report issued May 4, 2015 in Patent Application No. 201280004005.0 (with English language translation).
Extended European Searcn Report issued on Dec. 4, 2014 in Patent Application No. 12811214.1.

* cited by examiner

*Primary Examiner* — Huan Tran
(74) *Attorney, Agent, or Firm* — Oblon, McClelland, Maier & Neustadt, L.L.P.

(57) ABSTRACT

A mobile terminal includes a first fixed-interval timer that counts a first interval; a second fixed-interval timer that counts a second interval longer than the first interval; a motion acceleration detection unit that obtains a first period of acceleration data from an acceleration sensor at the first interval and detects motion acceleration based on the first period of acceleration data; a walking state detection unit that, when the motion acceleration is detected based on the first period of acceleration data, obtains a second period of acceleration data, which is longer than the first period, from the acceleration sensor and detects a walking state or a non-walking state based on the second period of acceleration data; and a continuous walking determining unit that determines that continuous walking is detected when the walking state is detected a predetermined number of times or more within the second interval.

5 Claims, 5 Drawing Sheets

MOBILE TERMINAL AND CONTINUOUS MOVEMENT DETECTION METHOD

TECHNICAL FIELD

An aspect of this disclosure relates to a mobile terminal and a continuous movement detection method.

BACKGROUND ART

Recent cell phones include many functions such as a global positioning system (GPS) function in addition to a standard call function. There exists a cell phone that includes a GPS function and a function to automatically and regularly measure its position using the GPS function and report positional information to, for example, a service provider (this function is hereafter referred to as "auto GPS function"). Here, the GPS function generally consumes a large amount of power. Therefore, it is desired to reduce the power consumption of a cell phone including the auto GPS function.

A related-art mobile terminal includes a position obtaining unit for obtaining positional information indicating its current location using the global positioning system, a movement sensor for detecting movement of the mobile terminal, a storing unit for storing a history of the positional information, and a recording unit that causes the position obtaining unit to newly obtain positional information only when movement is detected by the movement sensor and adds the newly obtained positional information in the storing unit (see, for example, patent document 1). With this configuration, the related-art mobile terminal reduces unnecessary consumption of battery power.

RELATED-ART DOCUMENTS

Patent Document

[Patent document 1] Japanese Laid-Open Patent Publication No. 2009-288233

DISCLOSURE OF INVENTION

Problems to be Solved by the Invention

To reduce power consumption, a typical cell phone including the auto GPS function is configured, for example, to determine whether the cell phone is moving or stationary based on the result of a continuous walking detection process performed using an acceleration sensor or the result of a sector switching detection process performed using base station area information, and to measure its position and report positional information to a service provider at predetermined intervals when it is determined that the cell phone is moving. Here, in such a cell phone that determines whether it is moving or stationary based on the result of a continuous walking detection process performed using an acceleration sensor, the acceleration sensor needs to be continuously in operation. In other words, in a cell phone that determines whether it is moving or stationary based on the result of a continuous walking detection process, its CPU needs to be always active.

Another type of cell phone, which determines whether it is moving or stationary based on the result of a continuous walking detection process, includes a sub-CPU for an acceleration sensor in addition to a main CPU (or host-CPU) so that the host-CPU can be kept inactive as far as possible and the power consumption is reduced. This method of reducing power consumption, however, makes it necessary for a cell phone to satisfy higher hardware requirements, i.e., to have special hardware such as a sub-CPU for an acceleration sensor.

A cell phone 10 disclosed in patent document 1 includes a pedometer 118 that detects the motion acceleration of the cell phone 10 and measures the number of steps taken by the user based on the detected motion acceleration. The cell phone 10 also includes a CPU 101 including a calculation unit 101A that calculates a moved distance based on the number of steps measured by the pedometer 118.

When the moved distance reaches a predetermined value, a recording control unit 101B of the CPU 101 activates a positioning unit 117 via a power controller 119 to obtain positional information indicating the current position of the cell phone 10 and then deactivates the positioning unit 117. Thus, the cell phone 10 is configured to cause the positioning unit 117 to stop obtaining positional information while the user is not moving to reduce power consumption.

However, with the configuration of the cell phone 10 of patent document 1, the CPU 101 including the calculation unit 101A and the recording control unit 101B is always active. In other words, the cell phone 10 is not configured to reduce power consumption by not activating the CPU 101 as far as possible.

An aspect of this disclosure provides a mobile terminal and a continuous movement detection method that make it possible to reduce power necessary to detect continuous walking without using special hardware.

Means for Solving the Problems

In an aspect of this disclosure, there is provided a mobile terminal that includes a first fixed-interval timer configured to count a first interval; a second fixed-interval timer configured to count a second interval that is longer than the first interval; a motion acceleration detection unit configured to obtain a first period of acceleration data from an acceleration sensor at the first interval and detect motion acceleration based on the first period of acceleration data; a walking state detection unit configured to, when the motion acceleration is detected based on the first period of acceleration data, obtain a second period of acceleration data, which is longer than the first period, from the acceleration sensor and detect a walking state or a non-walking state based on the second period of acceleration data; and a continuous walking determining unit configured to determine that continuous walking is detected when the walking state is detected a predetermined number of times or more within the second interval.

Advantageous Effect of the Invention

An embodiment of the present invention makes it possible to provide a mobile terminal and a continuous movement detection method that can reduce power necessary to detect continuous walking without using special hardware.

DESCRIPTION OF EMBODIMENTS

Embodiments of the present invention are described below with reference to the accompanying drawings. A mobile terminal according to an embodiment may be any type of apparatus, device, or terminal including an auto GPS function. For example, the mobile terminal may be a mobile communication terminal, a personal digital assistant (PDA), or a smartphone. A smartphone may support an open software platform such as Android (registered trademark). To reduce power consumption in a continuous movement detection process is one of the big challenges particularly for a smartphone.

A mobile terminal according to an embodiment may be configured to reduce power consumption by performing a continuous movement detection process using applications and without using special hardware such as a sub-CPU for an acceleration sensor as described below.

As described above, an auto GPS function of a mobile terminal automatically and regularly measures the position of a user (mobile terminal) using a GPS function and base stations of a telecommunications carrier and reports the measured position to a service provider (contents provider or telecommunications carrier). With the auto GPS function, a mobile terminal can provide various services via applications. For example, a mobile terminal can provide a service to "push" (or deliver) pinpoint weather information or local event information to the user based on the position of the user and an action support service that provides, for example, information on the last train at the nearest station.

<Method for Reducing Power Consumption in Related-Art Mobile Terminal Including Auto Gps Function>

Figure 1:
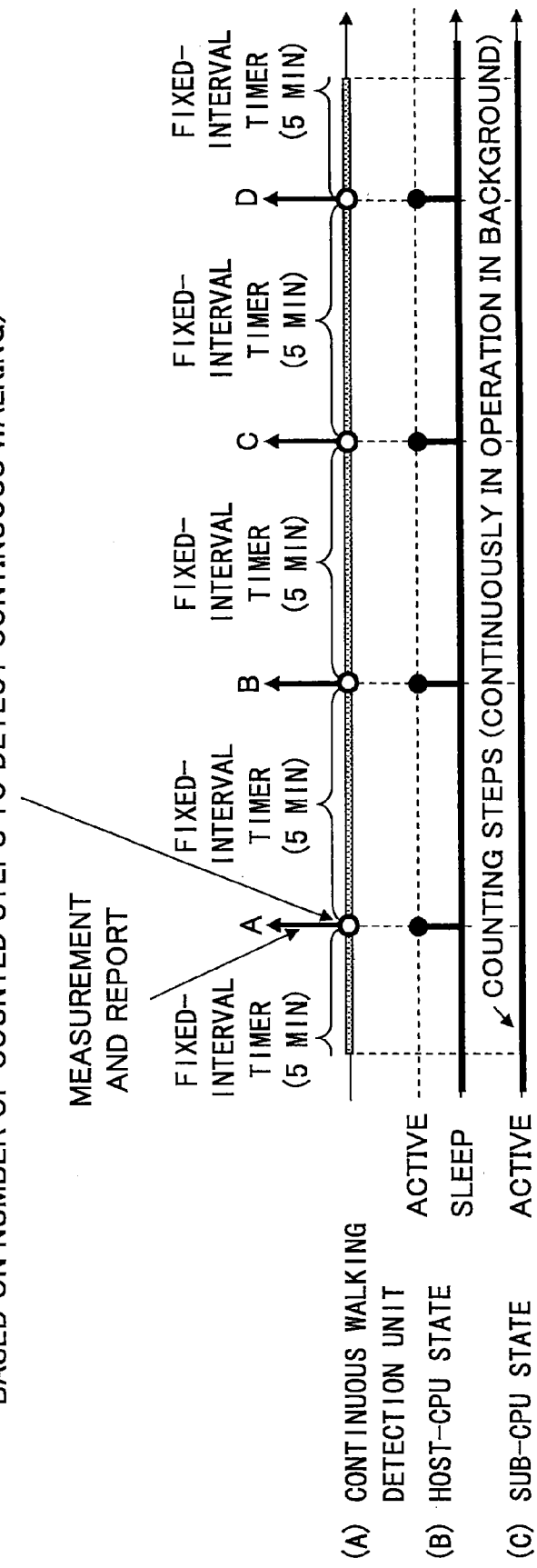
FIG. 1 is a drawing used to describe an exemplary method for reducing power consumption in a related-art mobile terminal including an auto GPS function.

FIG. 1 is a drawing used to describe an exemplary method for reducing power consumption in a related-art mobile terminal including an auto GPS function. FIG. 1 illustrates a method for reducing power consumption in a mobile terminal that determines whether it is moving or stationary based on the result of a continuous walking detection process performed using an acceleration sensor. In the case of FIG. 1, the mobile terminal includes a sub-CPU for the acceleration sensor in addition to a host-CPU.

FIG. 1 (C) indicates the state of the sub-CPU. As indicated by FIG. 1 (C), the sub-CPU is continuously in operation in the background. The sub-CPU counts the number of steps based on the acceleration detected by the acceleration sensor.

FIG. 1 (B) indicates the state of the host-CPU. As illustrated by FIG. 1 (B), the host-CPU enters an active state from a sleep state only for a predetermined period of time (e.g., 1 sec.) at, for example, 5-minute intervals counted by a fixed-interval timer. The time interval of the fixed-interval timer is not limited to 5 minutes but may be set at any value according to a time interval at which the auto GPS function obtains positional information and reports the positional information to a service provider.

FIG. 1 (A) indicates the state of a continuous walking detection unit. The continuous walking detection unit is activated when the host-CPU is in the active state. The continuous walking detection unit may be a part of a moving/stationary state determining function that determines whether the mobile terminal is moving or stationary based on the result of a sector switching detection process performed using base station area information. The continuous walking detection unit calculates a moved distance based on the number of steps counted by the sub-CPU and thereby detects continuous walking. When continuous walking is detected, a moving/stationary state determining unit causes the GPS function to obtain positional information and report the positional information to a service provider.

In the method of FIG. 1, the sub-CPU is used to count the number of steps to reduce time for which the host-CPU is in the active state. With the method of FIG. 1, however, the mobile terminal needs to satisfy hardware requirements, i.e., needs to have the sub-CPU for the acceleration sensor to detect continuous walking with reduced power consumption.

<Method for Reducing Power Consumption in Mobile Terminal of Embodiment Including Auto Gps Function>

Figure 2:
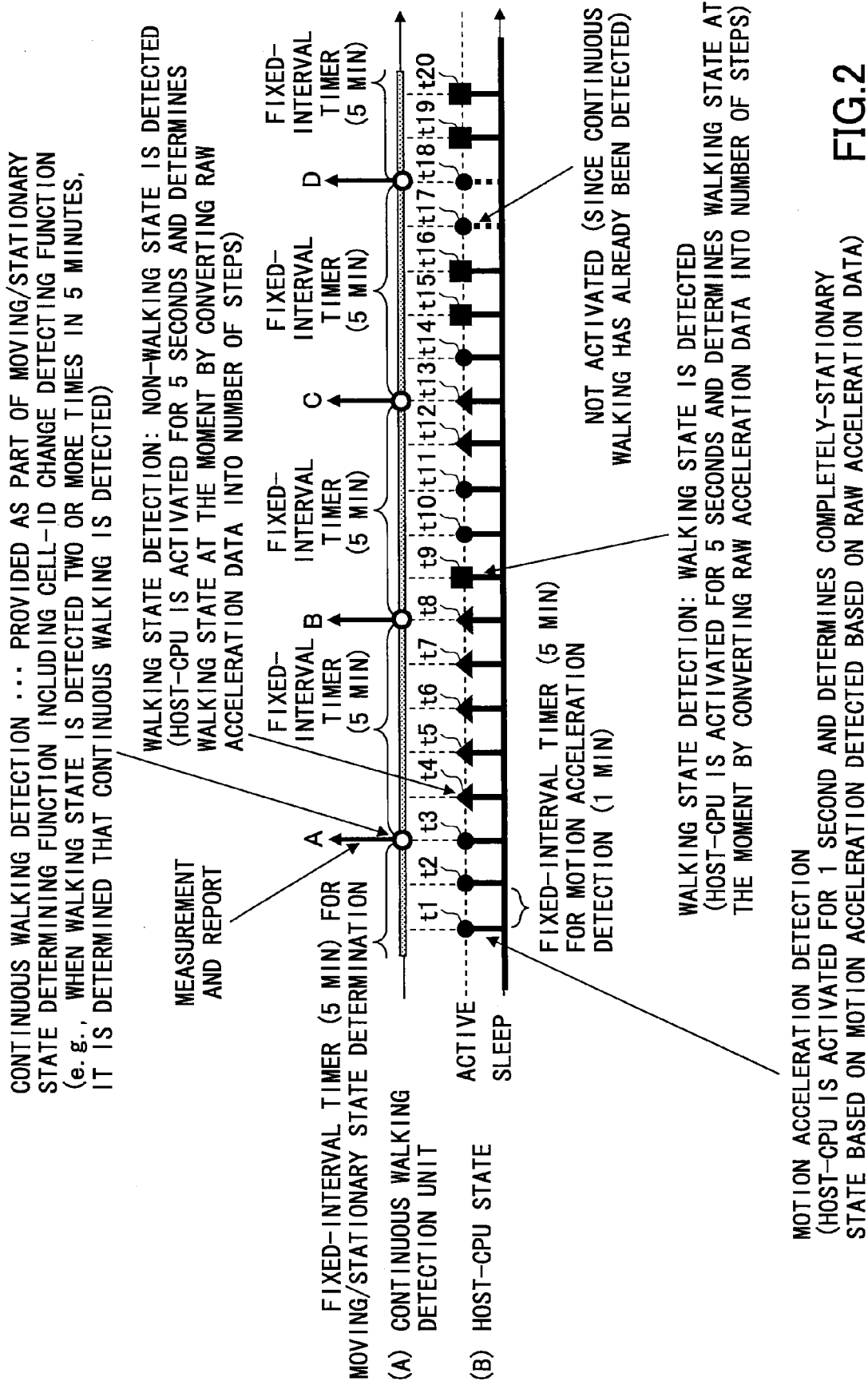
FIG. 2 is a drawing used to describe an exemplary method for reducing power consumption in a mobile terminal of an embodiment which includes an auto GPS function.

FIG. 2 is a drawing used to describe an exemplary method for reducing power consumption in a mobile terminal of the present embodiment which includes an auto GPS function. FIG. 2 illustrates a method for reducing power consumption in a mobile terminal that determines whether it is moving or stationary based on the result of a continuous walking detection process performed using an acceleration sensor. In the case of FIG. 2, the mobile terminal does not include a sub-CPU for the acceleration sensor and is configured to reduce power consumption through processes performed by applications.

FIG. 2 (B) indicates the state of a host-CPU. As illustrated by FIG. 2 (B), the host-CPU enters an active state from a sleep state only for a predetermined period of time (e.g., 0-5 sec.) at, for example, 1-minute intervals counted by a fixed-interval timer (first fixed-interval timer) for motion acceleration detection. The time interval of the fixed-interval timer for motion acceleration detection is not limited to one minute and may be set at any appropriate value. The host-CPU in the active state obtains raw data (acceleration data) of acceleration detected by the acceleration sensor and performs a motion acceleration detection process, a walking state detection process, and a continuous walking determination process as described below.

In the motion acceleration detection process, motion acceleration is measured based on a predetermined period (e.g., 1 sec.) of acceleration data at 1-minute intervals of the fixed-interval timer for motion acceleration detection, and whether the mobile terminal is completely stationary (where no motion acceleration is detected) or is making any movement (where motion acceleration is detected) is determined.

The walking state detection process is performed following the motion acceleration detection process when motion acceleration is detected. In the walking state detection process, a walking state or a non-walking state is detected based on a predetermined period (e.g., 5 sec.) of acceleration data.

In the continuous walking determination process, it is determined that continuous walking is detected when the walking state is detected two or more times in the walking state detection process within a 5-minute interval counted by a fixed-interval timer (second fixed-interval timer) for moving/stationary state determination. The time interval of the fixed-interval timer for moving/stationary state determination is not limited to 5 minutes but may be set at any value according to a time interval at which the auto GPS function obtains positional information and reports the positional information to a service provider.

At each of timings t1 through t3 in the example of FIG. 2 (B), the host-CPU is activated for one second, measures motion acceleration based on raw data of acceleration, and determines that the mobile terminal is completely stationary since no motion acceleration is detected. Since no motion acceleration is detected, the walking state detection process is not performed at timings t1 through t3 following the motion acceleration detection process.

At each of timings t4 through t8, the host-CPU is activated for one second, measures motion acceleration based on raw data of acceleration, and determines that the mobile terminal is moving since motion acceleration is detected. Since motion acceleration is detected, the walking state detection process is performed at timings t1 through t3 following the motion acceleration detection process. At each of timings t4 through t8, the host-CPU is activated for five seconds, converts raw data of acceleration into the number of steps, and detects a non-walking state.

At timing t9, the host-CPU is activated for one second, measures motion acceleration based on raw data of acceleration, and determines that the mobile terminal is moving since motion acceleration is detected. Since motion acceleration is detected, the walking state detection process is performed at timing t9 following the motion acceleration detection process. At timing t9, the host-CPU is activated for five seconds, converts raw data of acceleration into the number of steps, and detects a walking state.

At each of timings t10 and t11, similarly to timings t1 through t3, the host-CPU is activated for one second, measures motion acceleration based on raw data of acceleration, and determines that the mobile terminal is completely stationary since no motion acceleration is detected. Accordingly, at timings t10 and t11, the walking state detection process is not performed following the motion acceleration detection process.

At each of timings t12 and t13, similarly to timings t4 through t8, the host-CPU is activated for one second, measures motion acceleration based on raw data of acceleration, and determines that the mobile terminal is moving since motion acceleration is detected. Since motion acceleration is detected, the host-CPU is activated for five seconds and the walking state detection process is performed at timings t12 and t13 following the motion acceleration detection process. At timings t12 and t13, the non-walking state is detected.

At timing t14, similarly to timings t10 and t11, the host-CPU is activated for one second, measures motion acceleration based on raw data of acceleration, and determines that the mobile terminal is completely stationary since no motion acceleration is detected. Accordingly, at timing t14, the walking state detection process is not performed following the motion acceleration detection process.

At each of timings t15 and t16, similarly to timing t9, the host-CPU is activated for one second, measures motion acceleration based on raw data of acceleration, and determines that the mobile terminal is moving since motion acceleration is detected. Since motion acceleration is detected, the host-CPU is activated for five seconds and the walking state detection process is performed at timings t15 and t16 following the motion acceleration detection process. At timings t15 and t16, the walking state is detected. In this example, since the walking state is detected two times at timings t15 and t16 within the 5-minute interval of the fixed-interval timer for moving/stationary state determination, it is determined that continuous walking is detected.

At timings t17 and t18, the host-CPU is not activated since the continuous walking has already been detected in the same 5-minute interval of the fixed-interval timer for moving/stationary state determination. At each of timings t19 and t20, similarly to timings t15 and t16, the host-CPU is activated for one second, measures motion acceleration based on raw data of acceleration, and determines that the mobile terminal is moving since motion acceleration is detected. Since motion acceleration is detected, the host-CPU is activated for five seconds and the walking state detection process is performed at timings t19 and t20 following the motion acceleration detection process. At timings t19 and t20, the walking state is detected.

FIG. 2 (A) indicates the state of the continuous walking detection unit. The continuous walking detection unit is activated at, for example, 5-minute intervals of the fixed-interval timer for moving/stationary state determination. The continuous walking detection unit may be a part of a moving/stationary state determining function that determines whether the mobile terminal is moving or stationary based on the result of a sector switching detection process performed using base station area information. When it is determined in the continuous walking determination process that continuous walking is detected, a moving/stationary state determining unit causes the GPS function to obtain positional information and report the positional information to a service provider.

In FIG. 2, a continuous walking detection process is divided into the motion acceleration detection process, the walking state detection process, and the continuous walking determination process. In the continuous walking detection process, the motion acceleration detection process, the walking state detection process, and the continuous walking determination process are performed in this order. The time necessary for the motion acceleration detection process (e.g., 1 sec.) is less than the time necessary for the walking state detection process (e.g., 5 sec.). In the method of FIG. 2, the walking state detection process is performed following the motion acceleration detection process when motion acceleration is detected to reduce the amount of time when the host-CPU is in the active state.

Also in the method of FIG. 2, the fixed-interval timer for motion acceleration detection with a time interval (e.g., 1 min.) that is less than the time interval of the fixed-interval timer for moving/stationary state determination (e.g., 5 min.) is used for the motion acceleration detection process. This makes it possible to detect continuous walking with reduced power consumption without using special hardware such as a sub-CPU for the acceleration sensor.

Further in the method of FIG. 2, when the walking state is detected two or more times within a time interval of the fixed-interval timer for moving/stationary state determination, the motion acceleration detection process is not performed after the detection of the walking state within the same time interval. This makes it possible to further reduce the amount of time when the host-CPU is in the active state.

<Hardware Configuration of Mobile Terminal>

Figure 3:
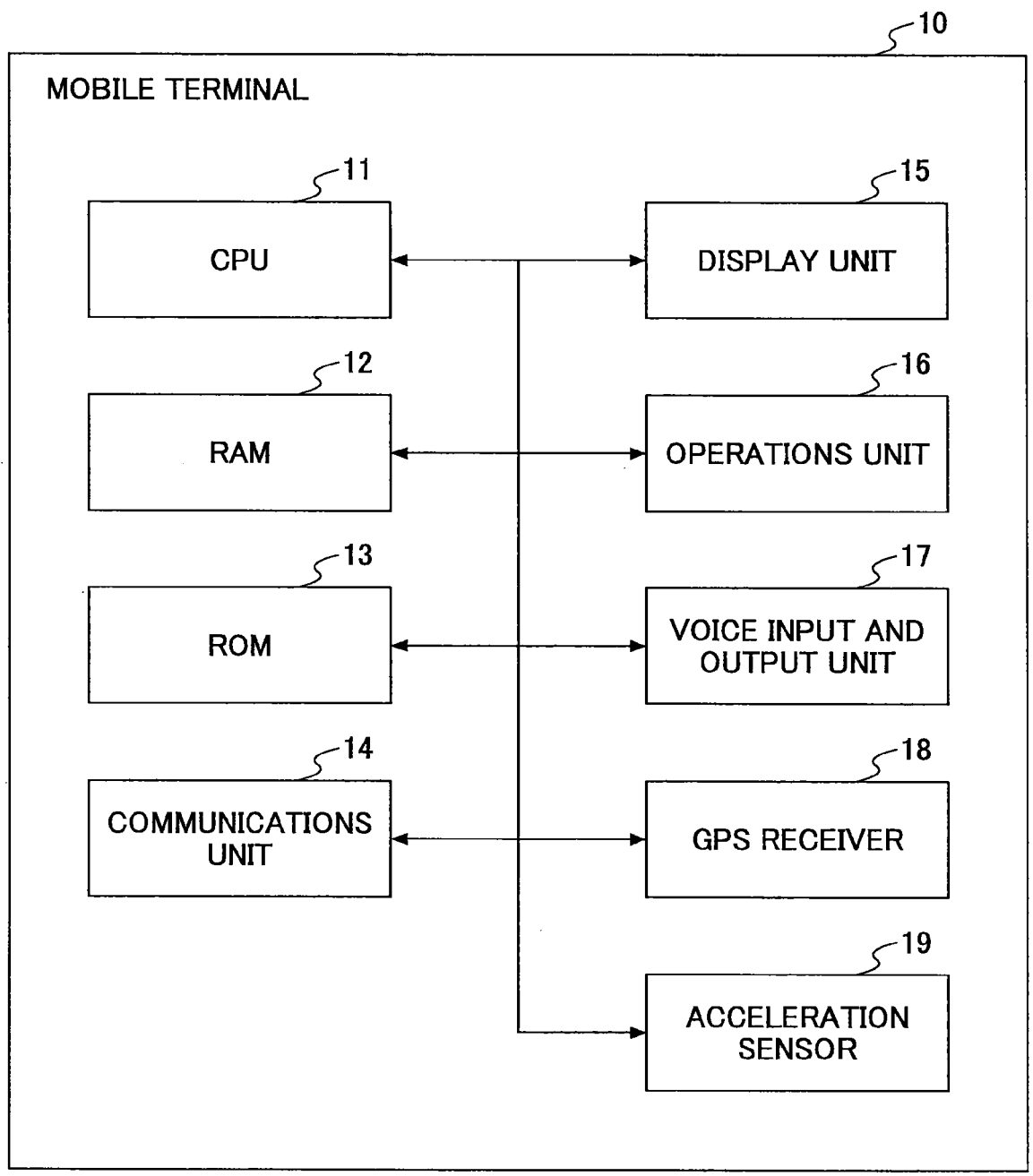
FIG. 3 is a block diagram illustrating an exemplary hardware configuration of a mobile terminal.

FIG. 3 is a block diagram illustrating an exemplary hardware configuration of a mobile terminal 10. In the example of FIG. 3, the mobile terminal 10 is configured as a mobile communication terminal.

As illustrated in FIG. 3, the mobile terminal 10 includes a central processing unit (CPU) 11, a random access memory (RAM) 12, a read-only memory (ROM) 13, a communications unit 14, a display unit 15, an operations unit 16, a voice input and output unit 17, a GPS receiver 18, and an acceleration sensor 19. The mobile terminal 10 may further include an electronically erasable and programmable ROM (EEPROM).

The CPU 11 executes programs stored in the ROM 13 using the RAM 12 as a work area and thereby controls other components of the mobile terminal 10. The RAM 12 is a memory allocated to programs executed by the CPU 11. The ROM 13, for example, stores programs to be executed by the CPU 11.

The communications unit 14 performs voice and data communications with external apparatuses such as a base station. The display unit 15 displays characters and images under the control of the CPU 11. For example, the display unit 15 may be implemented by a liquid-crystal display including a liquid-crystal driving circuit that drives liquid crystal to display characters and images under the control of the CPU 11.

The operations unit 16 receives user inputs and may be implemented by, for example, buttons and/or a touch panel. The user can input instructions via the operations unit 16. The operations unit 16 sends the instructions input by the user to the CPU 11. The voice input and output unit 17 may include a microphone for receiving voice for an outgoing call and a speaker for outputting voice in an incoming call. The GPS receiver 18 measures the current position of the mobile terminal 10 using the GPS system and thereby obtains positional information. The acceleration sensor 19 detects acceleration of the mobile terminal 10 and thereby obtains acceleration data.

The ROM 13 may store a continuous movement detection program that is one of programs for controlling the mobile terminal 10. The continuous movement detection program may be obtained from a recording medium or downloaded via a network.

For example, storage media such as a CD-ROM, a flexible disk, and a magneto-optical disk that record information optically, electrically, or magnetically, and semiconductor memories such as a ROM and a flash memory that record information electrically may be used as the storage medium.

The CPU 11 loads the continuous movement detection program stored in the ROM 13 into the RAM 13 and executes the continuous movement detection program to perform processes as described below.

<Functional Configuration of Mobile Terminal>

Figure 4:
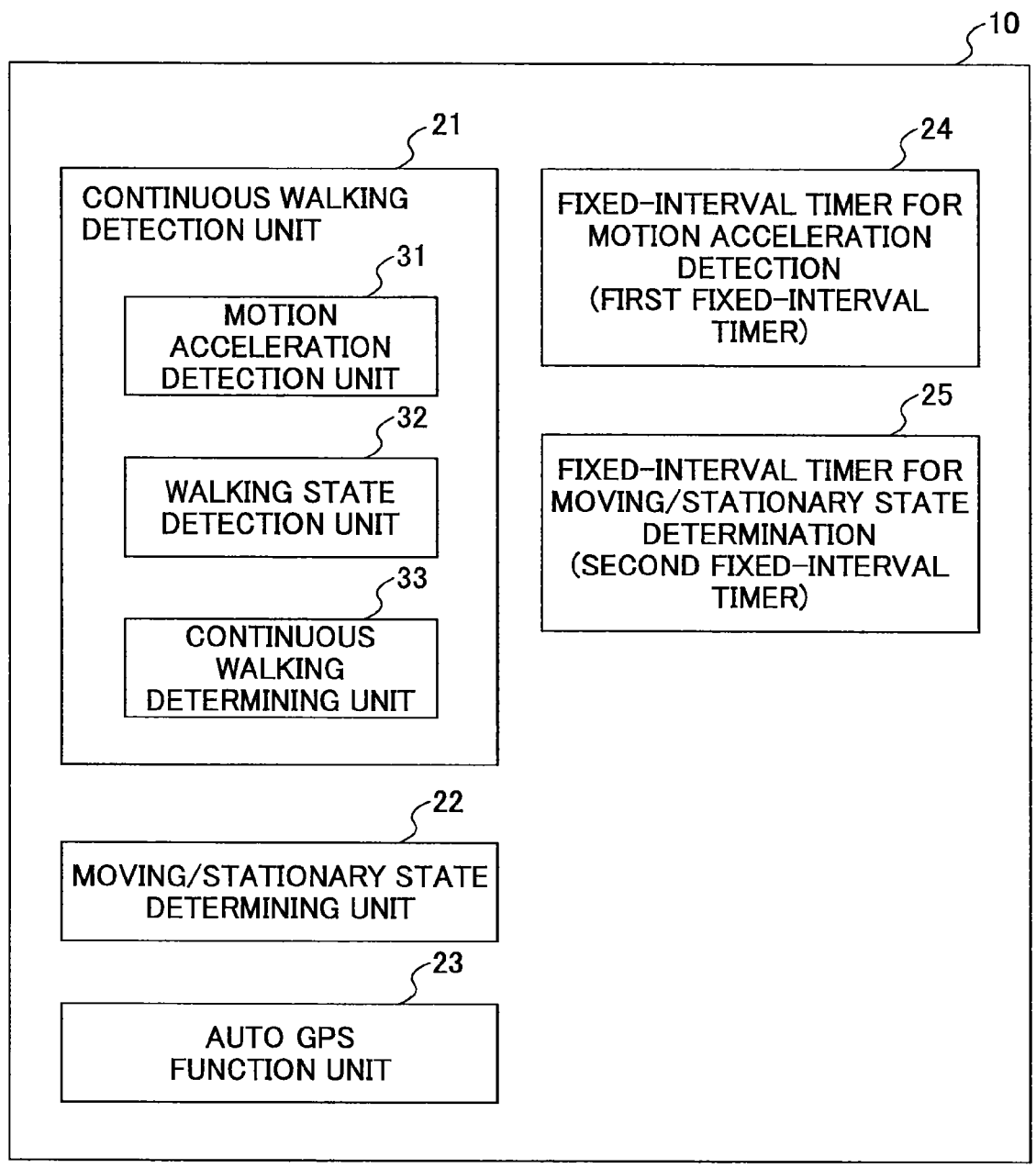
FIG. 4 is a block diagram illustrating an exemplary functional configuration of a mobile terminal according to an embodiment.

The mobile terminal 10 may include functional units as illustrated in FIG. 4. FIG. 4 is a block diagram illustrating an exemplary functional configuration of the mobile terminal 10 according to an embodiment. The mobile terminal 10 executes programs including the continuous movement detection program to implement functional units of FIG. 4 as, for example, modules. The mobile terminal 10 may include a continuous walking detection unit 21, a moving/stationary state determining unit 22, an auto GPS function unit 23, a fixed-interval timer (first fixed-interval timer) 24 for motion acceleration detection, and a fixed-interval timer (second fixed-interval timer) 25 for moving/stationary state determination. The continuous walking detection unit 21 includes a motion acceleration detection unit 31, a walking state detection unit 32, and a continuous walking determining unit 33. In FIG. 4, functional units that are not necessary to describe the present embodiment are omitted.

The motion acceleration detection unit 31 performs the motion acceleration detection process described above. For example, the motion acceleration detection unit 31 measures motion acceleration based on a predetermined period (e.g., 1 sec.) of acceleration data at 1-minute intervals of the fixed-interval timer 24, and determines whether the mobile terminal is completely stationary (where no motion acceleration is detected) or is making any movement (where motion acceleration is detected).

The walking state detection unit 32 performs the walking state detection process described above. For example, the walking state detection unit 32 performs the walking state detection process following the motion acceleration detection process when motion acceleration is detected. The walking state detection unit 32 detects a walking state or a non-walking state based on a predetermined period (e.g., 5 sec.) of acceleration data.

The continuous walking determining unit 33 performs the continuous walking determination process described above. For example, the continuous walking determining unit 33 determines that continuous walking is detected when the walking state is detected two or more times by the walking state detection unit 32 within a 5-minute interval counted by the fixed-interval timer 25 for moving/stationary state determination.

The moving/stationary state determining unit 22 determines whether the mobile terminal 10 is moving or stationary based on the result of the continuous walking detection process performed using the acceleration sensor 19 or based on the result of a sector switching detection process performed using base station area information. For example, when the continuous walking determining unit 33 determines that continuous walking is detected, the moving/stationary state determining unit 22 causes the auto GPS function unit 23 to obtain positional information and report the positional information to a service provider.

The auto GPS function unit 23 obtains positional information indicating the current position of the mobile terminal 10 using the GPS receiver 18, and sends the obtained positional information of the mobile terminal 10 via the communications unit 14 to, for example, a service provider.

The fixed-interval timer 24 for motion acceleration detection counts a time interval (e.g., 1 min.) that is less than the time interval (e.g., 5 min.) counted by the fixed-interval timer 25 for moving/stationary state determination. The fixed-interval timer 25 for moving/stationary state determination counts a time interval at which the auto GPS function unit 23 obtains positional information and reports the positional information to a service provider.

<Process Performed by Mobile Terminal>

Figure 5:
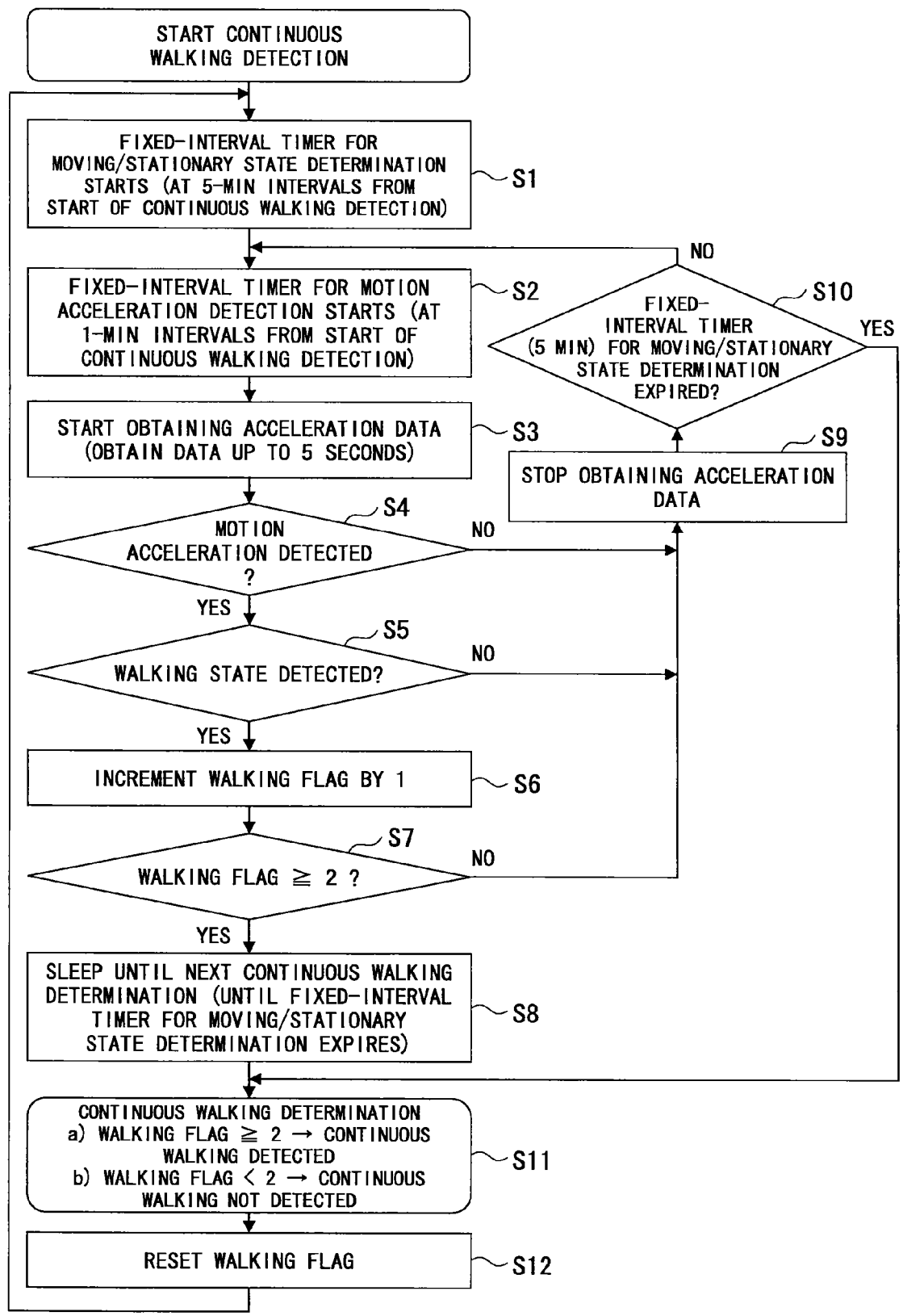
FIG. 5 is a flowchart illustrating an exemplary process performed by a mobile terminal.

The mobile terminal 10, for example, performs a process as illustrated in FIG. 5. FIG. 5 is a flowchart illustrating an exemplary process performed by the mobile terminal 10. In FIG. 5, steps that are not necessary to describe the present embodiment are omitted.

At step S1, the fixed-interval timer 25 for moving/stationary state determination starts and counts, for example, 5-minute intervals from the start of a continuous walking detection process. At step S2, the fixed-interval timer 24 for motion acceleration detection starts and counts, for example, 1-minute intervals from the start of the continuous walking detection process.

At step S3, the motion acceleration detection unit 31 starts obtaining, for example, up to 5 seconds of acceleration data at the intervals of the fixed-interval timer 24 for motion acceleration detection. In step S4, the motion acceleration detection unit 31 determines whether motion acceleration is detected based on, for example, one second of acceleration data.

When no motion acceleration is detected based on one second of acceleration data, the motion acceleration detection unit 31 stops obtaining acceleration data at step S9. In step S10, the fixed-interval timer 25 for moving/stationary state determination determines, for example, whether 5 minutes have passed. When 5 minutes have not passed yet, the fixed-interval timer 24 for motion acceleration detection returns to step S2.

When motion acceleration is detected based on one second of acceleration data, the walking state detection unit 32, at step S5, detects the walking state or the non-walking state based on, for example, 5 seconds of acceleration data.

When the non-walking state is detected based on 5 seconds of acceleration data, the motion acceleration detection unit 31 stops obtaining acceleration data at step S9. In step S10, the fixed-interval timer 25 for moving/stationary state determination determines, for example, whether 5 minutes have passed. When 5 minutes have not passed yet, the fixed-interval timer 24 for motion acceleration detection returns to step S2.

When the walking state is detected based on 5 seconds of acceleration data, the walking state detection unit 32 increments a walking flag by 1 at step S6. At step S7, the continuous walking determining unit 33 determines whether the walking flag is greater than or equal to 2. The walking flag becomes greater than or equal to 2 when the walking state is detected two or more times by the walking state detection unit 32.

When it is determined that the walking flag is less than 2, the motion acceleration detection unit 31 stops obtaining acceleration data at step S9. In step S10, the fixed-interval timer 25 for moving/stationary state determination determines, for example, whether 5 minutes have passed. When 5 minutes have not passed yet, the fixed-interval timer 24 for motion acceleration detection returns to step S2.

When it is determined that the walking flag is greater than or equal to 2, the motion acceleration detection unit 31, at step S8, enters a sleep state until the next continuous walking determination process (i.e., until the fixed-interval timer 25 for moving/stationary state determination expires) and stops obtaining acceleration data. Step S8 corresponds to a process performed at timings t17 and t18 in FIG. 2.

When the fixed-interval timer 25 for moving/stationary state determination determines that 5 minutes have passed in step S8 or S10, the process proceeds to step S11 where the continuous walking determining unit 33 performs the continuous walking determination process. For example, the continuous walking determining unit 33 determines that continuous walking is detected when the walking flag is greater than or equal to 2 and determines that continuous walking is not detected when the walking flag is less than 2. At step S12, the continuous walking determining unit 33 resets the walking flag and the process returns to step S1.

At timings t1-t3, t10-t11, and t14 in FIG. 2, steps S1-S4, S9, and S10 are performed in this order. At timings t4-t8 and t12-t13 in FIG. 2, steps S1-S5, S9, and S10 are performed in this order. At timing t9 in FIG. 2, steps S1-S7, S9, and S10 are performed in this order. At timings t15-t16 and t19-t20 in FIG. 2, steps S1-S8, S11, and S12 are performed in this order.

<Variation of Mobile Terminal>

The mobile terminal 10 described above is configured to detect a walking state. However, the present invention is not limited to the above described embodiment. For example, there is a technology for determining the type of a vehicle (transportation) based on acceleration data. The mobile terminal 10 may be configured to detect not only continuous walking but also continuous movement on a vehicle.

<Summary>

The embodiments of the present invention make it possible to detect continuous walking using a general-purpose acceleration sensor and applications and eliminate the need to use special hardware such as a sub-CPU for the acceleration sensor and to modify native software. Here, "native software" indicates software specialized for the CPU 11, the platform, and the API of the mobile terminal 10. Generally, native software cannot be modified without involving the manufacturer of the mobile terminal 10 and a telecommunications carrier.

The embodiments of the present invention also make it possible to implement a continuous walking detection function (moving/stationary state determining function) that consumes less power by just adding applications to a mobile terminal (smartphone) supporting an open platform such as Android (registered trademark), and thereby makes it possible to lengthen the battery life while providing an auto GPS function that enables various services.

Power saving effects of the above embodiments are estimated based on the conditions described below.

1) During walking, acceleration data is obtained via the acceleration sensor 19 at an interval of about 30 ms.

2) It is assumed that within a day (24 hours), the amount of time for which the user of the mobile terminal 10 moves (or walks) is 8 hours and the amount of time for which the user does not move is 16 hours.

3) Power consumed in measuring and reporting a position via the GPS function and consumed by other functions is not taken into account (i.e., the power saving effects in a moving/stationary state determining process based on detection of continuous walking are estimated).

Here, it is assumed that the battery life in the standby mode is 100%. In a mobile terminal where the host-CPU is continuously active, the battery life is reduced by about 84% during a continuous walking detection process. Meanwhile, in the mobile terminal 10 according to an embodiment of the present invention, the battery life is reduced by only about 16% during a continuous walking detection process. Thus, the embodiments of the present invention make it possible to effectively reduce power consumption necessary to detect continuous walking.

The present invention is not limited to the specifically disclosed embodiments, and variations and modifications may be made without departing from the scope of the present invention.

The above described embodiments and their combinations may be applied to a method, an apparatus, a system, a computer program, a storage medium, and a data structure.

The present international application claims priority from Japanese Patent Application No. 2011-153292 filed on Jul. 11, 2011, the entire contents of which are hereby incorporated herein by reference.

EXPLANATION OF REFERENCES

10 Mobile terminal
11 Central processing unit (CPU)
12 Random access memory (RAM)
13 Read-only memory (ROM)
14 Communications unit
15 Display unit
16 Operations unit
17 Audio input and output unit
18 GPS receiver
19 Acceleration sensor
21 Continuous walking detection unit
22 Moving/stationary state determining unit
23 Automatic GPS function unit
24 Fixed-interval timer for motion acceleration detection (first fixed-interval timer)
25 Fixed-interval timer for moving/stationary state determination (second fixed-interval timer)
31 Motion acceleration detection unit
32 Walking state detection unit
33 Continuous walking determining unit

The invention claimed is:

1. A mobile terminal, comprising:
a first fixed-interval timer configured to count a first interval;
a second fixed-interval timer configured to count a second interval that is longer than the first interval;
a motion acceleration detection unit configured to obtain a first period of acceleration data from an acceleration sensor at the first interval and detect motion acceleration based on the first period of acceleration data;

a walking state detection unit configured to, when the motion acceleration is detected based on the first period of acceleration data, obtain a second period of acceleration data from the acceleration sensor and detect a walking state or a non-walking state based on the second period of acceleration data, the second period being longer than the first period; and a continuous walking determining unit configured to determine that continuous walking is detected when the walking state is detected a predetermined number of times or more within the second interval.

2. The mobile terminal as claimed in claim 1, wherein when no motion acceleration is detected based on the first period of acceleration data, the motion acceleration detection unit stops obtaining acceleration data from the acceleration sensor until the first interval passes.

3. The mobile terminal as claimed in claim 1, wherein after obtaining the second period of acceleration data, the walking state detection unit stops obtaining acceleration data from the acceleration sensor until the first interval passes.

4. The mobile terminal as claimed in claim 1, wherein after the walking state is detected the predetermined number of times or more within the second interval, the motion acceleration detection unit stops obtaining acceleration data from the acceleration sensor until the second interval passes.

5. A continuous movement detection method performed by a mobile terminal, the method comprising:

obtaining a first period of acceleration data from an acceleration sensor at a first interval counted by a first fixed-interval timer and detecting motion acceleration based on the first period of acceleration data;

when the motion acceleration is detected based on the first period of acceleration data, obtaining a second period of acceleration data from the acceleration sensor and detecting a walking state or a non-walking state based on the second period of acceleration data, the second period being longer than the first period; and determining that continuous walking is detected when the walking state is detected a predetermined number of times or more within a second interval counted by a second fixed-interval timer, the second interval being longer than the first interval.

\* \* \* \* \*